Feb. 26, 1957 A. D. LIDDERDALE 2,782,906
CABLE LAYING APPARATUS
Filed Jan. 10, 1956 3 Sheets-Sheet 1

Inventor:
Aubrey Douglas Lidderdale
By his attorneys:
Baldwin & Wight

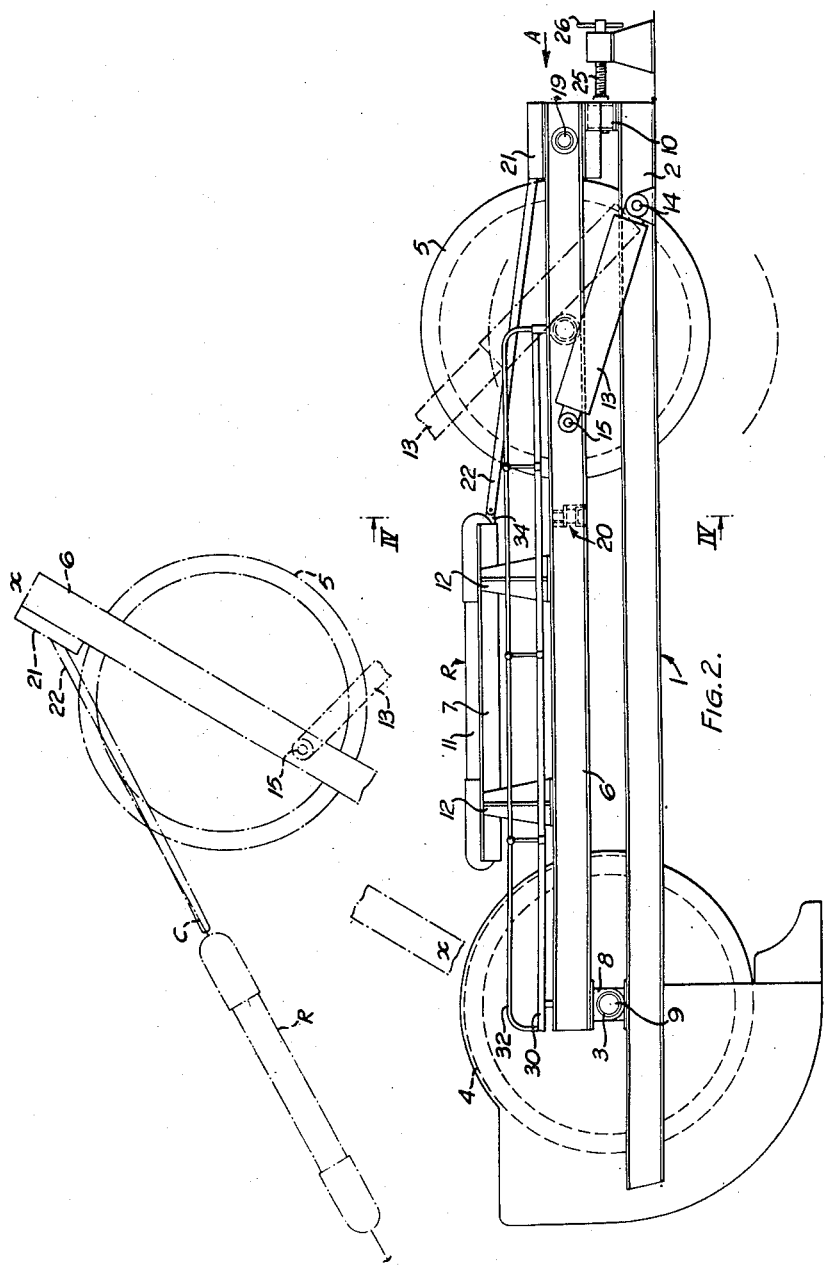

Feb. 26, 1957  A. D. LIDDERDALE  2,782,906
CABLE LAYING APPARATUS
Filed Jan. 10, 1956  3 Sheets-Sheet 3
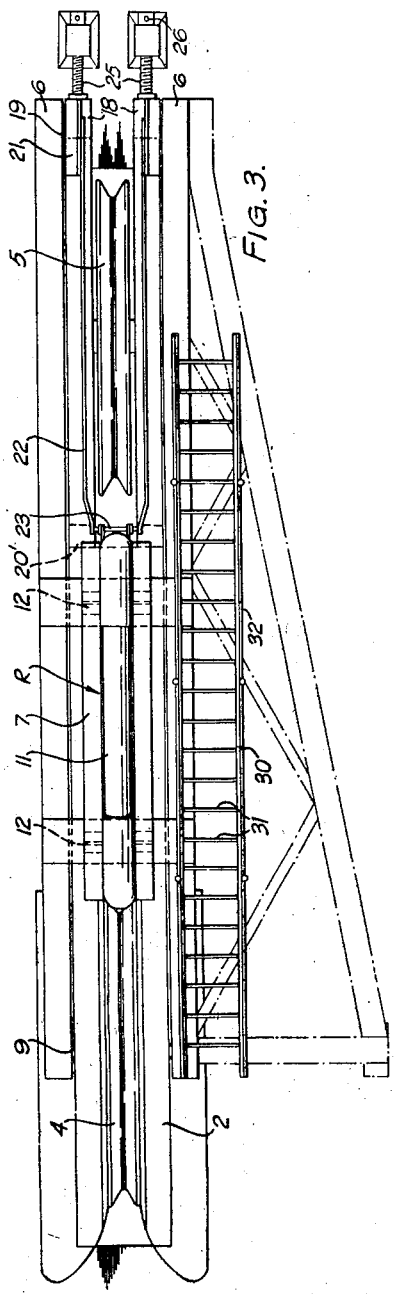

2,782,906

CABLE LAYING APPARATUS

Aubrey Douglas Lidderdale, Bromley, England, assignor to Telegraph Construction & Maintenance Company Limited, London, England, a British company Application January 10, 1956, Serial No. 558,314

Claims priority, application Great Britain January 11, 1955

8 Claims. (Cl. 203—340)

This invention relates to apparatus for laying submarine cables, particularly submarine cables fitted with repeaters.

Submarine cables are usually laid by paying them out over a large diameter sheave at the bow, or as in this case the stern of a cable laying ship. The development of the use of repeaters in submarine cables has however raised a problem in that a "lump" type repeater, which may comprise an outer casing up to 12 feet in length and 1 foot in diameter, cannot be payed out over the sheave in the usual way without risk of bending the cable at its junction with the ends of the repeater and causing damage at that point.

The object of the present invention therefore is to provide an apparatus for laying submarine cable fitted with repeaters by means of which the repeater during the laying process can be maintained substantially in alignment with the cable in the immediate vicinity of the connections to the repeater.

According to the present invention an apparatus for laying submarine cable fitted with repeaters comprises a main paying out sheave, secondary sheave located forward of the main sheave and, between the two sheaves, a cradle for supporting a repeater, the secondary sheave being so mounted that when a repeater is located on the cradle the secondary sheave may be raised with respect to the main sheave into contact with the cable so as to take over on the inboard side of the repeater, the paying out function of the main sheave. When the secondary sheave takes over the paying out function that part of the cable containing the repeater, being on the outboard side of the paying out sheave, may then be laid without throwing the repeater out of line with the cable in its immediate vicinity.

Preferably the secondary sheave is so mounted that during the normal paying out of cable it may be raised into a position where it partly supports the cable inboard of the main sheave so that in conjunction with a load measuring device it may function as a dynamometer. In this case when a repeater is to be laid, the secondary sheave is lowered so as to allow the repeater to be passed onto the cradle without it being thrown out of alignment with the inboard part of the cable.

In a preferred form of the invention the secondary sheave is carried with the cradle on a bracket which is pivoted about the axis of the main sheave so that the cradle is raised with the secondary sheave.

In one embodiment of the invention the apparatus comprises a main sheave mounted in the conventional manner over the stern of a cable laying ship, a bracket pivoted about the axis of the main sheave and extending forwards of it and, mounted on the bracket, a cradle for a repeater and a secondary sheave. The bracket comprises two parallel members, the rear ends of which are pivoted about the axis of the main sheave, one member on each side of the sheave. Mounted midway along the members is a cradle adapted to support a repeater lengthwise between the two sheaves.

At the forward end of the bracket members is pivoted a fork in which is rotatably mounted the secondary sheave. The fork extends rearwardly between the bracket members and its closed end is adapted to rest on a load cell supported on a cross bar between the two bracket members. The secondary sheave is mounted in the fork between this supporting point and the point at which the fork is pivoted on the bracket. The bracket members may be raised and lowered, i. e. pivoted about the axis of the main sheave, by means of two hydraulic rams, one on each bracket member. Other suitable means, e. g. a screw jack may be employed.

The invention is illustrated in the accompanying drawings in which

Figures 2 and 3 are respectively an elevation and a plan view of a cable laying apparatus in accordance with one embodiment of the invention.

Figure 1:
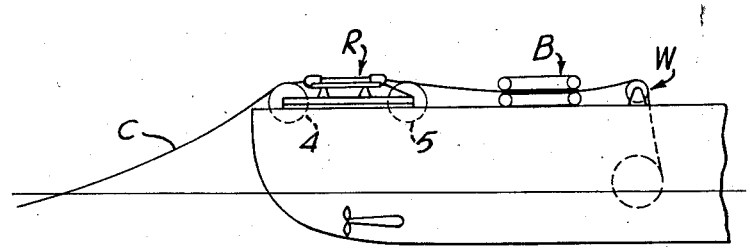
Figure 1 is a diagrammatic view showing the stern of a cable laying ship fitted with cable laying apparatus in accordance with the invention.
Figure 4:
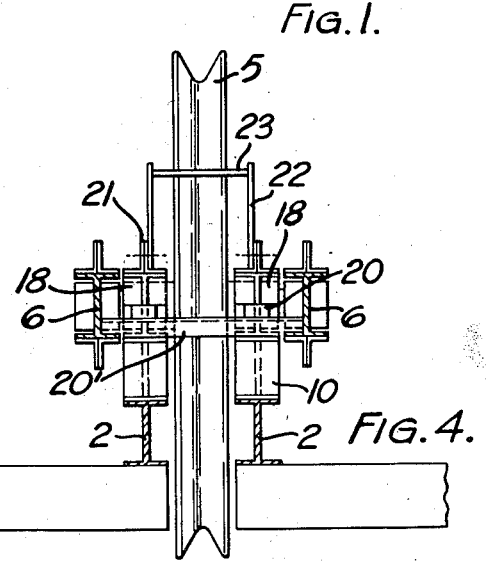
Figure 4 is a transverse sectional view on the lines IV—IV of Fig. 2.

In the drawings C indicates a length of cable in the course of being payed out over the stern of the ship and in which cable it is usual to insert at predetermined intervals repeater apparatus, one of the repeaters being indicated at R. The cable to be laid, it will be understood, is supplied from coils stored in the cable holds of the ship, from which it is passed over a winch W at deck level and from the winch it is drawn rearwards in direction of arrow A towards the stern by feeding mechanism known in the cable industry as a caterpillar, consisting of upper and lower conveyor belts B between which the cable is gripped. In order to provide for the passage of the repeater, one or both of the conveyors, usually only the upper one is capable of displacement so that the gap between the conveyor belts can be opened up to accommodate the increase in diameter of the repeater housing.

The cable laying apparatus of this invention comprises deck framework indicated generally at 1, and consisting conveniently of the two I-section steel joists 2, seen in elevation in Figure 2, on which are mounted at one end, bearings 3 for journalling a main or stern sheave 4. Located forward of the main sheave 4 is a secondary sheave 5, this sheave being capable of being raised, as hereinafter explained, on passage of a repeater housing R so that the secondary sheave 5 will take over from the main sheave 4, the paying out function. When in its raised position the sheave assumes the position shown in dotted lines in Fig. 2.

For this purpose the secondary sheave 5 is supported in bearings at the forward end of bracket arms 6, the bracket arms 6 being mounted for angular movement about a centre concentric with the axis of the main sheave 4.

As can be seen from Figure 2 the bracket arms 6 at their rear ends have downwardly extending lugs 8 which engage trunnion pins 9 on the deck frame 1. In the normal position of the parts, when the cable is being laid, the secondary sheave 5 is at a level slightly above that of the main sheave 4 and when in this position the bracket arms 6 extend forwardly in a plane parallel to that of the deck, being supported in this position by a stop block 10. In this position, which is the normal run of the cable while being payed out the cable passes over the secondary sheave 5 to the main or stern sheave 4 and thence over the stern of the ship.

Between the main and secondary sheaves 4 and 5 is a cradle 7 which is in the form of a trough and of sufficient size to accommodate the length and width of the repeater apparatus R, one of which is shown in position at 11 in Figure 2. The cradle 7 is itself supported by pedestals 12 from the bracket arms 6. Hydraulic rams 13, of which there are two, one at each side of the bracket 5 are provided for raising and lowering the same, the cylinders of the rams being anchored at points 14 on the deck joists 2, the ram plungers being pivotally connected at their ends 15 to the respective bracket arms 6.

It is desirable to provide a dynamometer device to measure the tension in the cable as it is being payed out and for this purpose the bearings for the secondary sheave 5 are carried by a lever device in the form of a forked member comprising short lever arms 18 pivotally secured to fulcrums 19 on the bracket arms 6, these arms at their closed end being supported by engagement with a load measuring device 20 carried by a cross bar 20' on the bracket arms. It will be appreciated, therefore, that the load measuring device 20 will function as a dynamometer and enable measurements to be made from which can be ascertained the tension in the cable as it passes over the sheave 5.

It will be appreciated that when the secondary sheave 5 is raised at which time the repeater will be supported in the cradle 7, it is necessary to take the weight of the repeater housing, which will tend to slide forwardly. Provision is made therefore for releasably hooking the repeater housing to the bracket arms. In the embodiment illustrated, anchor plates 21 are attached to the bracket arms 18, to which plates is hingedly connected a U-shaped strap 22 having a cross bar 23. On the cross bar 23 is a quick release clamp or catch by means of which the repeater housing 11 can be held against sliding in its cradle 7 when the latter is raised.

Figure 5:
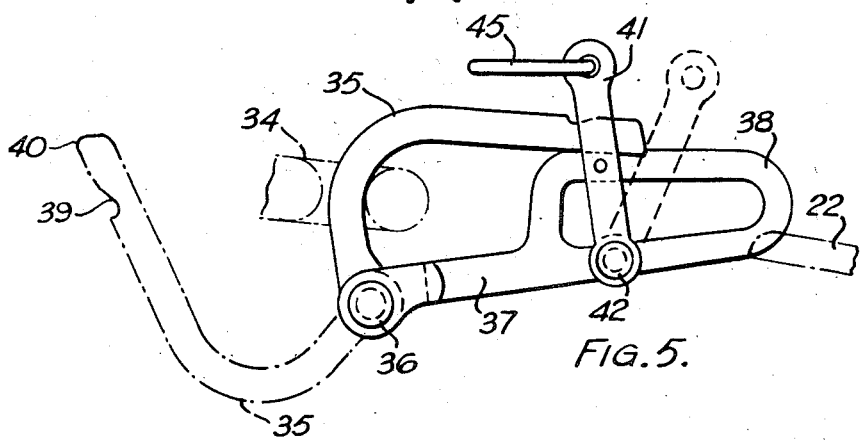
Figure 5 is a detail view of a quick release catch for holding the repeater housing in its cradle when being raised to its elevated position prior to release.

A suitable form of quick release catch is shown in Figure 5 consisting of a pivoted arm 35 which operates as a release hook and is pivotally connected at 36 on an extension 37 of the cross bar 23 of the strap 22. On the extension 37 is also formed a loop 38 which provides a platform or stop for the release hook 35. The upper side of the release hook arm 35 is cut away at its end to form a recess 39 including a radiused portion 40 to enable the entry into the recess of a latch member 41 which consists of a U-piece and is hingedly mounted at 42 on the extension 37. The underside of the release hook arm 35 may be grooved longitudinally so that when in its closed position it nests against the seating provided by the platform 38. To release the latch 41 a pull cord 45 is attached to the end thereof.

When paying out cable over the main sheave in the normal way, for example by means of the "caterpillar" feed B located forward of the sheaves, the position of the bracket arms 6 is such that the secondary sheave 5 is at a level slightly above the main sheave 4 so that it partly supports the inboard portion of the cable between the main sheave and the caterpillar B.

Because of this the load supported by the secondary sheave is recorded by the load meter 20 on which one end of the fork carrying the secondary sheave is supported and thus the tension in the cable may be measured.

When a repeater apparatus is due to be payed out, the secondary sheave 5 is lowered to the position shown in dash lines in Figure 2, the purpose of this being to enable the repeater housing to ride over the secondary sheave and on to the cradle 7 without it being thrown out of alignment with the inboard portion of the cable between the main sheave and the feed.

To enable this operation to take place the first step is to withdraw the stop block 10. This may be done by hand, but preferably, as indicated in Figure 2, a quick operating screw jack 25 operated by a turnbuckle 26 is provided to withdraw the block 10. The bracket arms 6 will be released and are then free to pivot in a clockwise direction about their fulcrum 9, this movement, if necessary, being brought about by the hydraulic rams 13.

It will be appreciated that by dropping the sheave 5 to the dot and dash line position the repeater housing can pass over the top of the sheave without becoming out of alignment with the centreline of the cable and until such time as it has been drawn on to the cradle 7.

With the repeater in position on the cradle, the paying out operation is temporarily arrested (by halting the "caterpillar" feed) whereupon the hydraulic rams 13 are brought into operation to raise the bracket arms 6 and restore them to their normal position when the block 10 can be reinserted. The next step is to continue the movement of the rams in order to raise the arms 6 and cradle 10 to the elevated position shown in chain lines. This lifting movement is continued to a position until the angle as shown by the centreline X—X is such that the length of cable, outboard of the repeater, is clear of the main sheave and the repeater is lifted from the cradle into line with the outboard cable. At the same time as the secondary sheave is raised the caterpillar feed is restarted to prevent the repeater being drawn back on to the secondary sheave.

As the cable continues to be fed through the "caterpillar," the repeater is payed out over the stern of the ship and when it is away the secondary sheave is lowered into the normal paying out position in which it functions as a dynamometer sheave.

Under certain conditions of operation and depending upon the angle at which it is released, there is a risk that the repeater, as the cradle is being raised, especially towards the latter part of its movement will tend to slip downwards.

To prevent slip and to hold the repeater housing in position on its cradle, a shackle indicated at 34 is provided at one end of the repeater, and, prior to the cradle being raised, the release hook 35 is inserted through the shackle 34 of the repeater and then turned about its pivot 36 and locked in the full line position shown in Figure 5 by means of the latch 41.

It will be seen, therefore, that any tendency of the repeater to slip down the cradle as it is being raised, will be prevented since it is firmly held by the shackle 34 engaging the release hook 35.

When the cradle and supporting arms are in their fully elevated position and immediately the "caterpillar" has been started up to continue the paying out movement of the cable, the operator pulls the trip cord 45 to move the latch 41 to its release position as shown in dotted lines, whereupon the release hook 35 will open under the weight of the repeater housing and permit it to move forward with the cable.

To enable inspection of the repeater or cable when the bracket is in its elevated position, a ladder may be provided. As shown in Figure 2 the ladder comprises longitudinal members 30 joined to each other by rungs 31. 32 is a hand rail.

What is claimed is:

1. Apparatus for laying submarine cables having repeaters at intervals comprising a main sheave for paying out the cable, a secondary sheave located forwardly of the main sheave, a cradle arranged between the two sheaves and adapted to support a repeater during the paying out operation, and means for raising the secondary sheave to a position above the main sheave and where the cable and its associated repeater are lifted clear of the main sheave.

2. Apparatus for laying submarine cables having repeaters at intervals comprising a base, a main sheave journalled on the base for paying out the cable, a bracket mounted to fulcrum about a centre on the base adjacent the axis of rotation of the main sheave, a secondary sheave carried by said bracket, a cradle adapted to support a repeater and mounted on the bracket in a position between said main and secondary sheaves, and means for raising and lowering the bracket to enable the secondary sheave to be elevated to a position where the cable and its associated repeater are clear of the main sheave.

3. Apparatus for laying submarine cables having repeaters at intervals comprising a base frame, a main sheave for paying out the cable, said sheave being mounted on said frame at one end thereof, a bracket mounted to fulcrum on said base frame, a secondary sheave supported on said bracket in a position where it is located forwardly of the main sheave, a cradle adapted to support a repeater and secured to the bracket in a position between the main and secondary sheaves, and means for raising and lowering the bracket carrying the secondary sheave, whereby the latter can be elevated to a position where the cable and its asociated repeater are lifted clear of the main sheave.

4. Apparatus for laying submarine cables having repeaters at intervals comprising a base frame, a main sheave for paying out the cable and mounted on said frame at one end thereof, a bracket mounted to fulcrum on said base frame, a secondary sheave supported on said bracket in a position where it is located forwardly of the main sheave, a cradle on the bracket and adapted to support a repeater in a position between the main and secondary sheaves, and fluid operated means for raising and lowering the bracket carrying the secondary sheave, whereby the latter can be elevated to a position where the cable and its associated repeater are lifted clear of the main sheave.

5. Apparatus for laying submarine cables having repeaters at intervals as set forth in claim 2, in which the bracket comprises parallel arms, said bracket arms being capable of angular movement about fulcrums on the base and in which the cradle is secured between said bracket arms.

6. Apparatus for laying submarine cables having repeaters at intervals as set forth in claim 2 having stop means to limit the movement of the bracket in a downwards direction so that normally it is retained in a position where the secondary sheave is at a level slightly above that of the main sheave.

7. Apparatus for laying submarine cables having repeaters at intervals as set forth in claim 6 having means to withdraw the stop means so as to allow the bracket to move to a position where the secondary sheave is below the level of the main sheave to enable the repeater housing to ride over the secondary sheave and on to the cradle without it being thrown out of alignment with the outgoing cable.

8. Apparatus for laying submarine cables having repeaters at intervals as set forth in claim 6, including a lever device fulcrumed on the bracket and supporting the secondary sheave, and a load indicating device associated with said lever device in order to measure the tension in the cable while it is being payed out.

No references cited.